(12) United States Patent
Maki et al.

(10) Patent No.: US 6,548,919 B2
(45) Date of Patent: Apr. 15, 2003

(54) LINEAR MOTOR

(75) Inventors: Kohji Maki, Hitachi (JP); Kim Houng Joong, Hitachi (JP); Hiroshi Katayama, Hitachinaka (JP); Kenji Miyata, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 28 days.

(21) Appl. No.: 09/793,779

(22) Filed: Feb. 27, 2001

(65) Prior Publication Data

US 2002/0053834 A1 May 9, 2002

(30) Foreign Application Priority Data

Nov. 6, 2000 (JP) ........................................ 2000-342376

(51) Int. Cl.[7] ............................................... H02K 41/03
(52) U.S. Cl. .......................................... 310/12; 318/135
(58) Field of Search ............................. 310/12, 13, 14; 318/135

(56) References Cited

U.S. PATENT DOCUMENTS 4,254,350 A * 3/1981 Miroshnichenko et al. ... 310/13
4,945,268 A * 7/1990 Nihei et al. .................... 310/12
6,078,114 A * 6/2000 Bessette et al. ................ 310/12

FOREIGN PATENT DOCUMENTS

| EP | PCT/JP00/02808 |   | 4/2000 |
| JP | 10-174418 | * | 6/1998 |
| JP | A-10-174418 |   | 6/2001 |

* cited by examiner

Primary Examiner—Nestor Ramirez
Assistant Examiner—Judson H. Jones
(74) Attorney, Agent, or Firm—Antonelli, Terry, Stout & Kraus, LLP

(57) ABSTRACT

In a linear motor comprising, a stator, a movable element, and an electromagnetic coil device for magnetizing the movable element or stator, the stator includes at least one pair of magnetic core parts, and at least two pairs of magnetic poles, the magnetic poles of each of the at least two pairs are aligned on an imaginary line perpendicular to the movable direction, magnetic polar directions of the at least two pairs adjacent to each other are opposite to each other, first one of the magnetic poles of each of the at least two pairs faces to a first side surface of the movable element, and second one of the magnetic poles of each of the at least two pairs faces to a second side surface of the movable element opposite to the first side surface in a traverse direction perpendicular to the movable direction.

18 Claims, 15 Drawing Sheets

LINEAR MOTOR

BACKGROUND OF THE INVENTION AND RELATED ART STATEMENT

The present invention relates to a linear motor in which a movable member is magnetically driven between magnetic poles.

In a prior art linear motor as disclosed by JP-A-10-174418, pairs of magnetic poles adjacent to each other are magnetized by respective electromagnetic coils.

OBJECT AND SUMMARY OF THE INVENTION

An object of the present invention is to provide a linear motor in which a number of electromagnetic coils is minimized and a magnetic flux is effectively utilized for generating an output force.

According to the present invention, in a linear motor comprising, a stator, a movable element movable with respect to the stator in a movable direction, and an electromagnetic coil device for energizing at least one of the movable element and the stator to be magnetized so that a relative movement between the movable element and the stator in the movable direction is generated by a magnetic field between the movable element and the stator, the stator includes at least one pair of magnetic core parts, and at least two pairs of magnetic poles adjacent to each other in the movable direction, the magnetic poles of each of the at least two pairs are aligned on an imaginary line perpendicular to the movable direction to generate the magnetic field passing the magnetic poles of each pair through the movable element, a magnetic polar direction of one of the at least two pairs is opposite to that of another one of the at least two pairs adjacent to the one of the at least two pairs in the movable direction, first one of the magnetic poles of each of the at least two pairs faces to a first side surface of the movable element, and second one of the magnetic poles of each of the at least two pairs faces to a second side surface of the movable element opposite to the first side surface in a traverse direction perpendicular to the movable direction.

Since the magnetic polar direction of one of the at least two pairs is opposite to that of another one of the at least two pairs adjacent to the one of the at least two pairs in the movable direction, a size of the stator is decreased.

When one of the magnetic core parts forms both of the first one of the magnetic poles of the one of the at least two pairs and the second one of the magnetic poles of the another one of the at least two pairs adjacent to the one of the at least two pairs in the movable direction, and another one of the magnetic core parts forms both of the first one of the magnetic poles of the another one of the at least two pairs and the second one of the magnetic poles of the one of the at least two pairs adjacent to the another one of the at least two pairs in the movable direction, a size of the stator is minimized. When the pair of magnetic core parts is magnetized by single electromagnetic coil, a number of electromagnetic coils in the linear motor is minimized.

When one of the magnetic core parts forms both of the first one of the magnetic poles of the one of the at least two pairs and the first one of the magnetic poles of the another one of the at least two pairs adjacent to the one of the at least two pairs in the movable direction, and another one of the magnetic core parts forms both of the second one of the magnetic poles of the another one of the at least two pairs and the second one of the magnetic poles of the one of the at least two pairs adjacent to the another one of the at least two pairs in the movable direction, a size of the stator is minimized. When the pair of magnetic core parts is magnetized by single electromagnetic coil, a number of electromagnetic coils in the linear motor is minimized.

When the at least one of the movable element and the stator energized by the electromagnetic coil device has at least two parts to be magnetized respectively with a difference in energized phase between the at least two parts so that a travelling magnetic field for generating the relative movement between the movable element and the stator element in the movable direction is formed, and each of the at least two parts is magnetized by single electromagnetic coil, a number of electromagnetic coils in the linear motor is minimized.

When the stator includes at least two of the pairs of magnetic core parts and at least four of the pairs of magnetic poles juxtaposed with each other in the movable direction, each of the at least two pairs of magnetic core parts forms at least partially two of the at least four pairs of magnetic poles adjacent to each other in the movable direction, and a magnetic polar direction of one of the two of the at least four pairs of magnetic poles is opposite to a magnetic polar direction of another one of the two of the at least four pairs of magnetic poles, a size of the stator is minimized. When each of the at least two pairs of magnetic core parts is magnetized by single electromagnetic coil, a number of electromagnetic coils in the linear motor is minimized.

The movable member may include at least one of an electromagnetic coil and a permanent magnet to form pairs of magnetic poles juxtaposed with each other in the movable direction. The movable member may include pairs of high-reluctance portions and low-reluctance portions adjacent to each other in the movable direction, and the pairs of high-reluctance portions and low-reluctance portions are juxtaposed with each other in the movable direction. The movable member may be stationary while the stator is moved. The stator may be stationary while the movable member is moved. The electromagnetic coil device may energize the movable element. The electromagnetic coil device may energizes the stator. The stator may have a permanent magnet for forming therein at least one pair of magnetic poles.

When the linear motor is a multi-phase linear motor, a distance between a pair of magnetic poles of one of the at least two parts and a pair of magnetic poles of another one of the at least two parts adjacent to each other in the movable direction=$(k*P)+(P/M)$, when P is a pitch of the pairs of the magnetic poles adjacent to each other in the movable direction in each of the at least two parts, k is an integral number not less than zero, and M is a number of the at least two parts energized with respective energized phases different from each other while M is an integral number not less than two. When the linear motor is a single-phase linear motor for moving or vibrating the movable member by a moving or vibrating width substantially equal to the pitch P of the pairs of the magnetic poles adjacent to each other in the movable direction, the magnetic polar direction of each of the at least two pairs of magnetic poles alternates while the magnetic polar direction of one of the at least two pairs of magnetic poles is opposite to that of another one of the at least two pairs of magnetic poles adjacent to the one of the at least two pairs of magnetic poles in the movable direction.

The stator or magnetic core may have an opening through which the movable member is inserted between the magnetic poles of each of the pairs in a direction perpendicular to the movable direction. A magnetic force is generated in a direction perpendicular to the movable direction and not parallel to the polar directions between the stator and the movable member, when a magnetic flux axis of the magnetic poles of at least one pair on the stator is distant away from a magnetic flux axis of the magnetic poles of at least one pair on the movable member in the direction between the magnetic poles of at least one pair on the stator. When the electromagnetic coil device has an electromagnetic coil whose circumferential part is completely surrounded by the pair of magnetic core parts as seen in the movable direction, that is, the pair of magnetic core parts extends around or over the whole outer periphery of the circumferential part of the electromagnetic coil, the electromagnetic coil is securely held or protected by the pair of magnetic core parts.

DETAILED DESCRIPTION OF PREFERRED EMBODIMENTS

Figure 1:
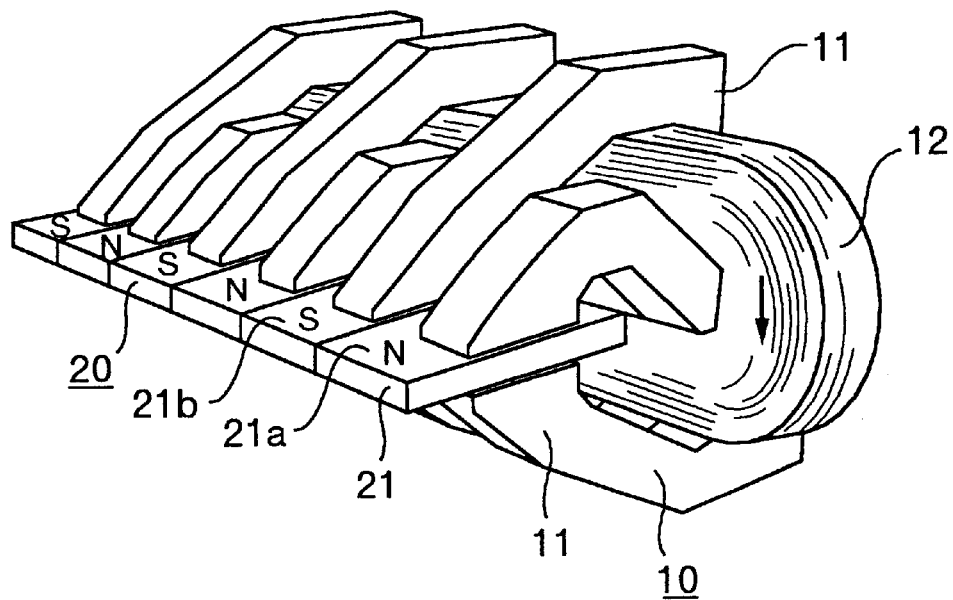
FIG. 1 is an oblique projection view showing a combination of a stator magnetic core with single electromagnetic coil and a movable member with permanent magnets in a linear motor of the invention.

As shown in FIG. 1, a linear motor has a stator 10 including a magnetic core 11 of magnetic conductivity and an electromagnetic coil 12 surrounding a part of the magnetic core 11, and a movable member 20 supported movably with respect to the stator 10. The magnetic core may include iron or the like. The movable member 20 has permanent magnets 21 which are juxtaposed with each other in a movable direction of the movable member 20 while polar directions 21a and 21b of the permanent magnets 21 adjacent to each other in the movable direction are opposite to each other.

Figure 2:
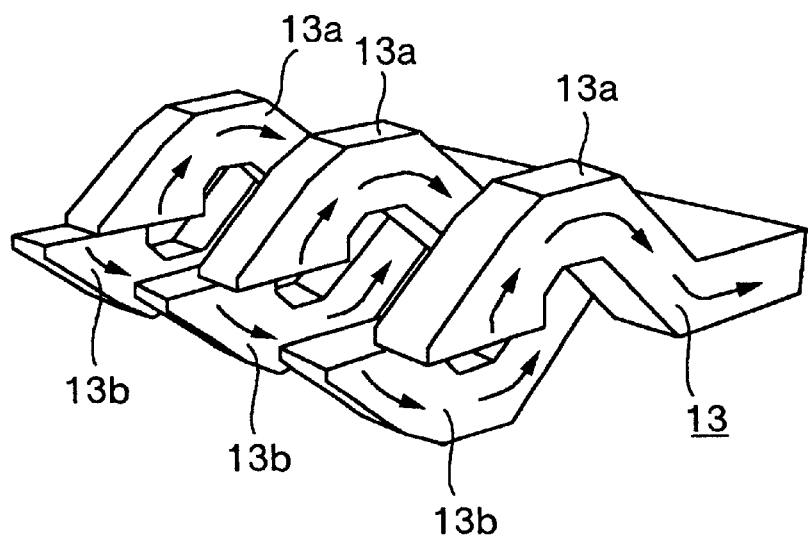
FIG. 2 is an oblique projection view showing a part of the stator magnetic core.
Figure 3:
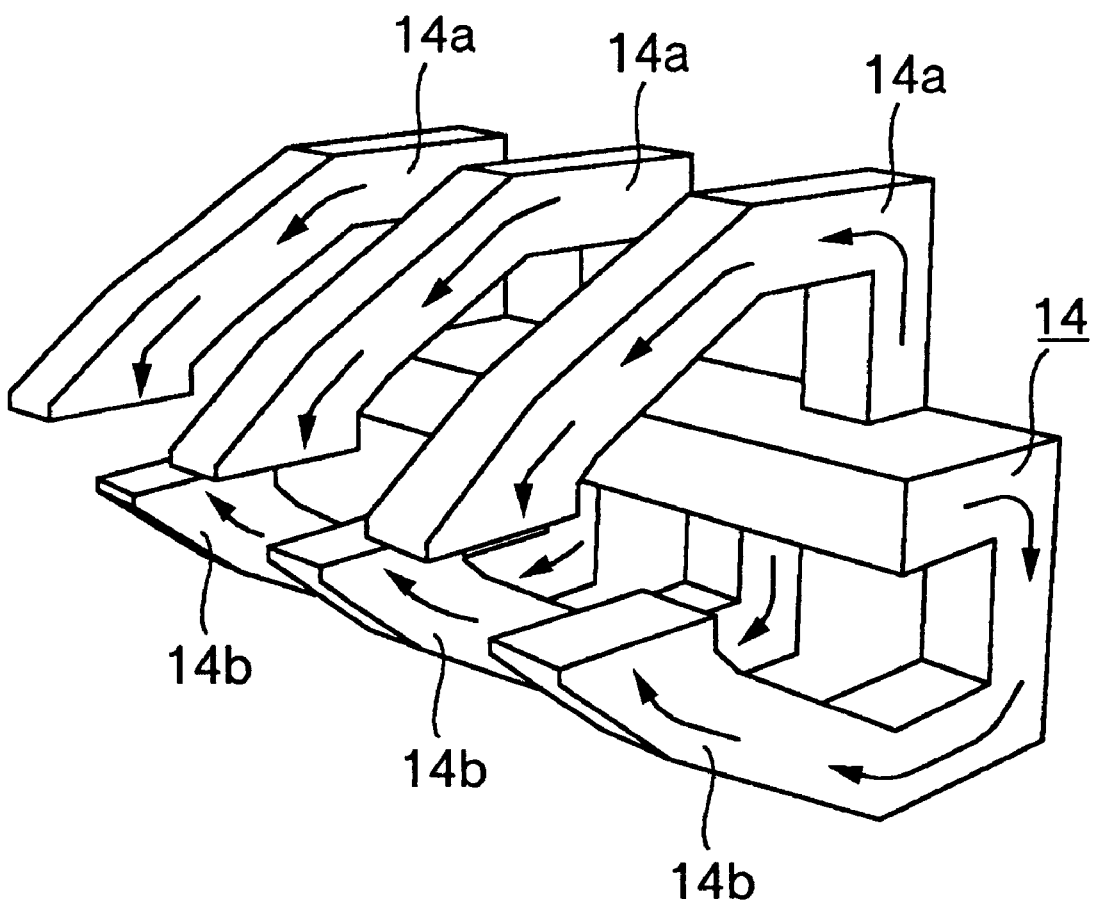
FIG. 3 is an oblique projection view showing another part of the stator magnetic core.
Figure 4:
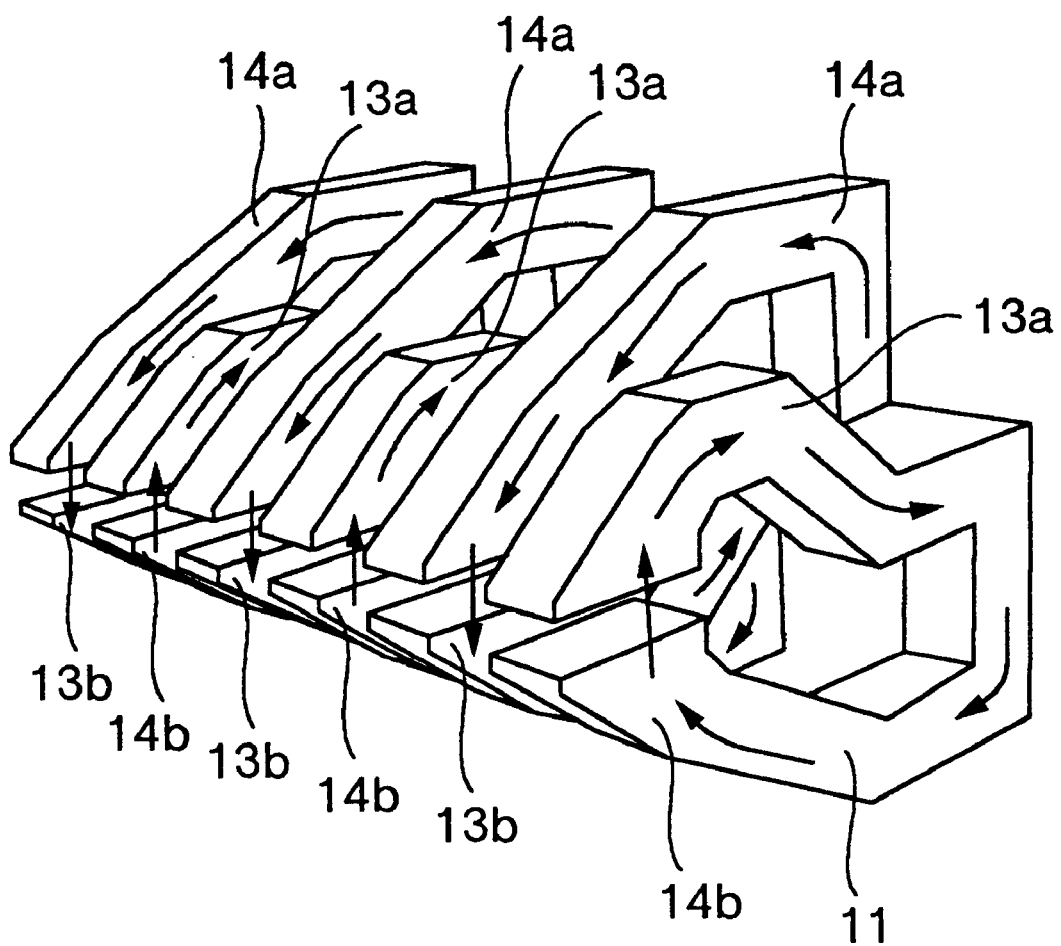
FIG. 4 is an oblique projection view showing the stator magnetic core.

As shown in FIG. 2, a magnetic core part 13 of the magnetic core 11 has first magnetic poles 13a and second magnetic poles 13b, and as shown in FIG. 3, a magnetic core part 14 of the magnetic core 11 has first magnetic poles 14a and second magnetic poles 14b. Arrows in FIGS. 2 and 3 denote flows of magnetic flux generated in the magnetic core 11 by single electromagnetic coil 12. As shown in FIG. 4, in the assembled magnetic core 11, a polar direction of a pair of the first magnetic poles 13a and the second magnetic poles 14b is opposite to a polar direction of a pair of the first magnetic poles 13b and the second magnetic poles 14a adjacent to the pair of the first magnetic poles 13a and the second magnetic poles 14b in the movable direction when the magnetic core 11 is magnetized by the electromagnetic coil 12. The movable member 20 extends between the first magnetic poles 13a and the second magnetic poles 14b of each pair and between the first magnetic poles 13b and the second magnetic poles 14a of each pair so that the movable member 20 cooperates magnetically with the magnetic core 11. A circumferential part of the electromagnetic coil 12 is surrounded by the magnetic core 11 as seen in the movable direction.

Figure 5:
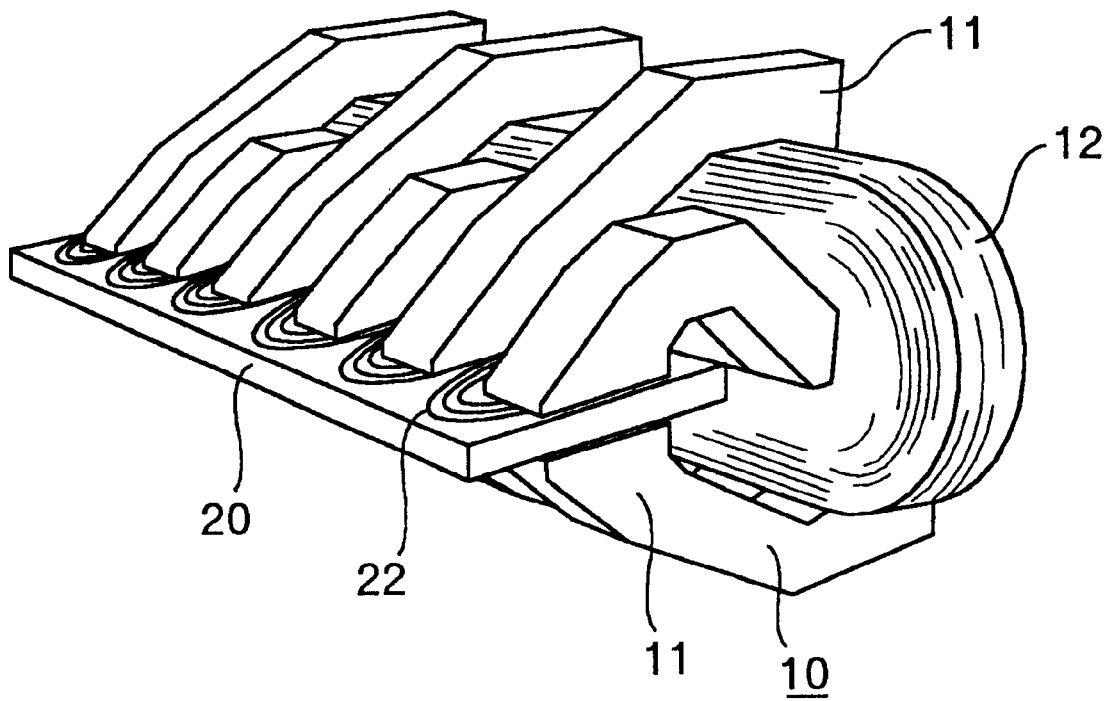
FIG. 5 is an oblique projection view showing a combination of the stator magnetic core with single electromagnetic coil and another movable member with electromagnetic coils in another linear motor of the invention.

As shown in FIG. 5, the movable member 20 may include electromagnetic coils 22 which are juxtaposed with each other in the movable direction while polar directions of the electromagnetic coils 22 adjacent to each other in the movable direction are opposite to each other so that the movable member 20 cooperates magnetically with the magnetic core 11. A pitch between the magnetic poles adjacent to each other in the movable member 20 is equal to a pitch between the magnetic poles adjacent to each other in the magnetic core 11. A pole core member of high-magnetic-conductivity may be surrounded by each of the electromagnetic coils 22. The movable member 20 may include both the electromagnetic coils 22 and the permanent magnets 21. The electromagnetic coils 22 may overlap each other as seen in a direction perpendicular to the movable direction. The electromagnetic coils 22 may be printed coils.

Figure 6:
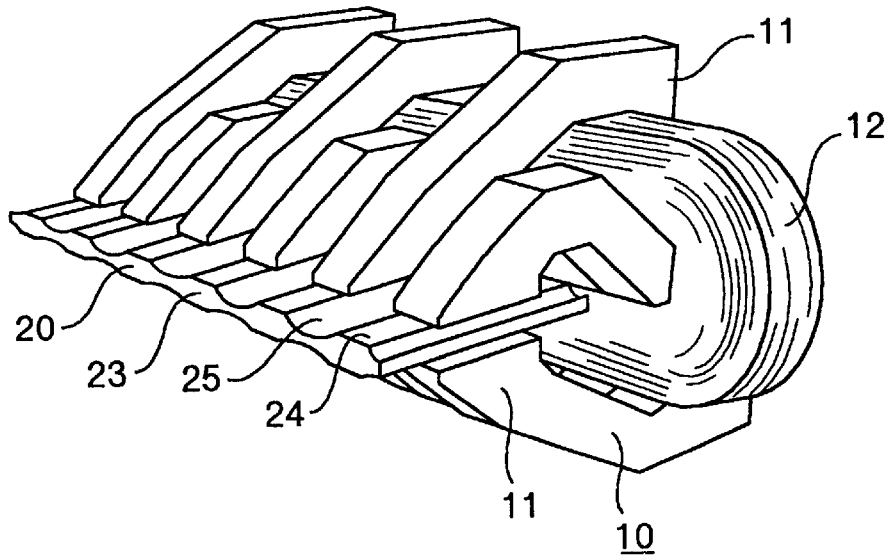
FIG. 6 is an oblique projection view showing a combination of the stator magnetic core with single electromagnetic coil and another movable member with pairs of high-reluctance portions and low-reluctance portions in another linear motor of the invention.

As shown in FIG. 6, the movable member 20 may include pairs of high reluctance portions 25 and low reluctance portions 24 juxtaposed with each other in the movable direction. The permanent magnets 21 may be additionally included by the movable member 20 with the pairs of high reluctance portions 25 and low reluctance portions 24. The high reluctance portions 25 may be formed of non-magnetically-conductive material.

Figure 7:
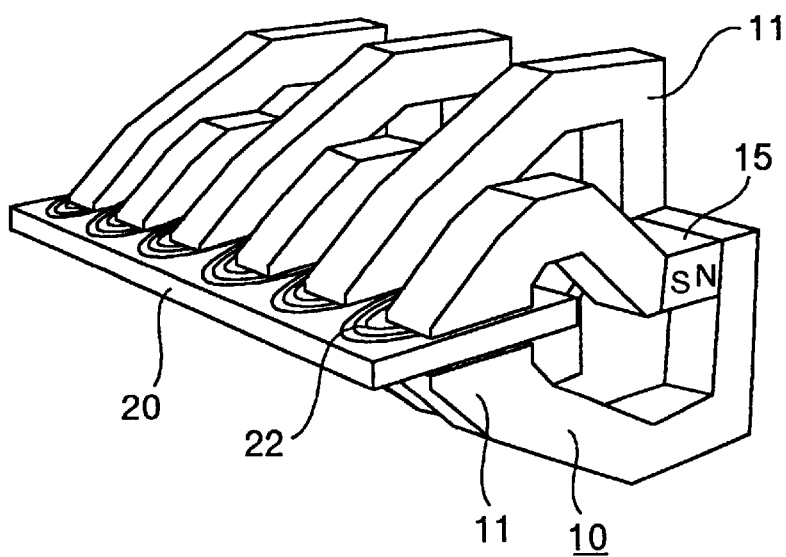
FIG. 7 is an oblique projection view showing a combination of another stator magnetic core with a permanent magnet and the another movable member with electromagnetic coils in another linear motor of the invention.

As shown in FIG. 7, the magnetic core 11 may be magnetized by a permanent magnet 15. A cross sectional shape of the movable member 20 may be rectangular, circular or oval. The stator 10 may be stationary while the movable member 20 is movable, and alternatively the stator 10 may be movable while the movable member 20 is stationary.

Figure 8:
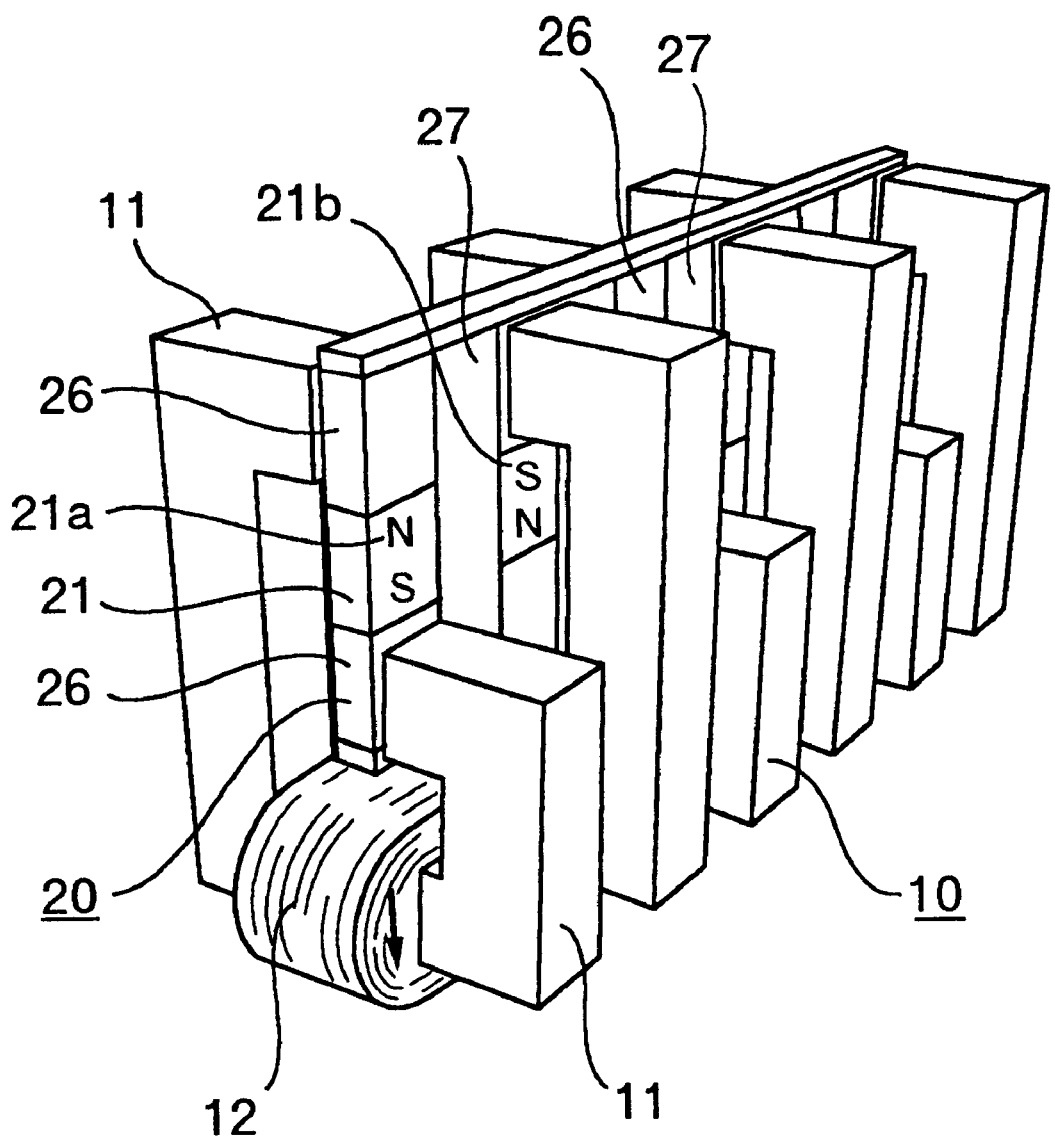
FIG. 8 is an oblique projection view showing a combination of another stator magnetic core with single electromagnetic coil and another movable member with permanent magnets in a linear motor of the invention.

As shown in FIG. 8, a linear motor has the stator 10 including the magnetic core 11 of magnetic conductivity and the electromagnetic coil 12 surrounding the part of the magnetic core 11 between longitudinal ends of the magnetic core 11 so that a magnetic flux passes the longitudinal ends, and the movable member 20 supported movably with respect to the stator 10. The magnetic core may include iron or the like. The movable member 20 has the permanent magnets 21 which are juxtaposed with each other in a movable direction of the movable member 20 and magnetically conductive areas 26 with non magnetically conductive areas 27 between the permanent magnets 21 and between the magnetically conductive areas 26 while the polar directions 21a and 21b of the permanent magnets 21 adjacent to each other in the movable direction are opposite to each other.

Figure 9:
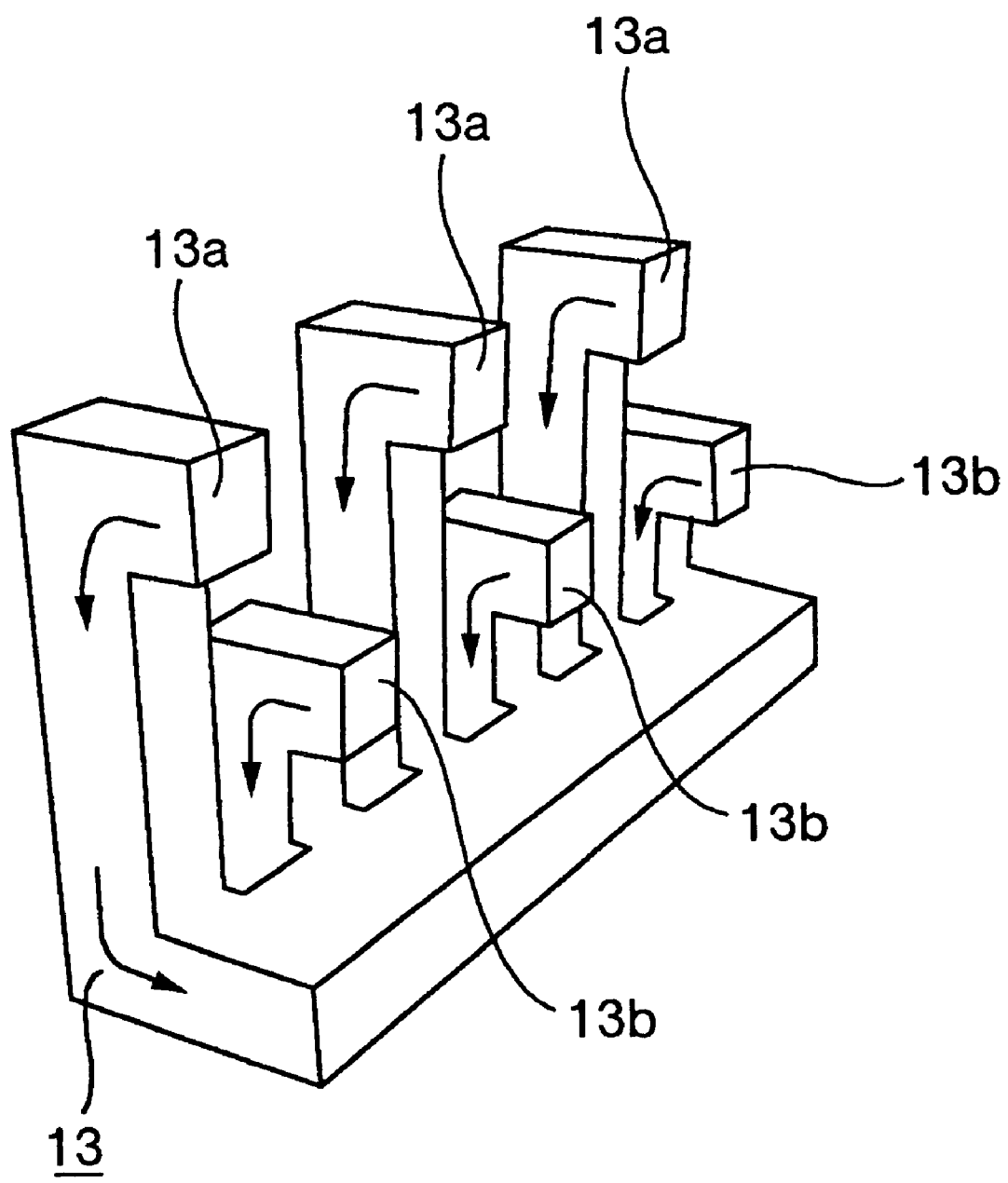
FIG. 9 is an oblique projection view showing a part of the another stator magnetic core of FIG. 8.
Figure 10:
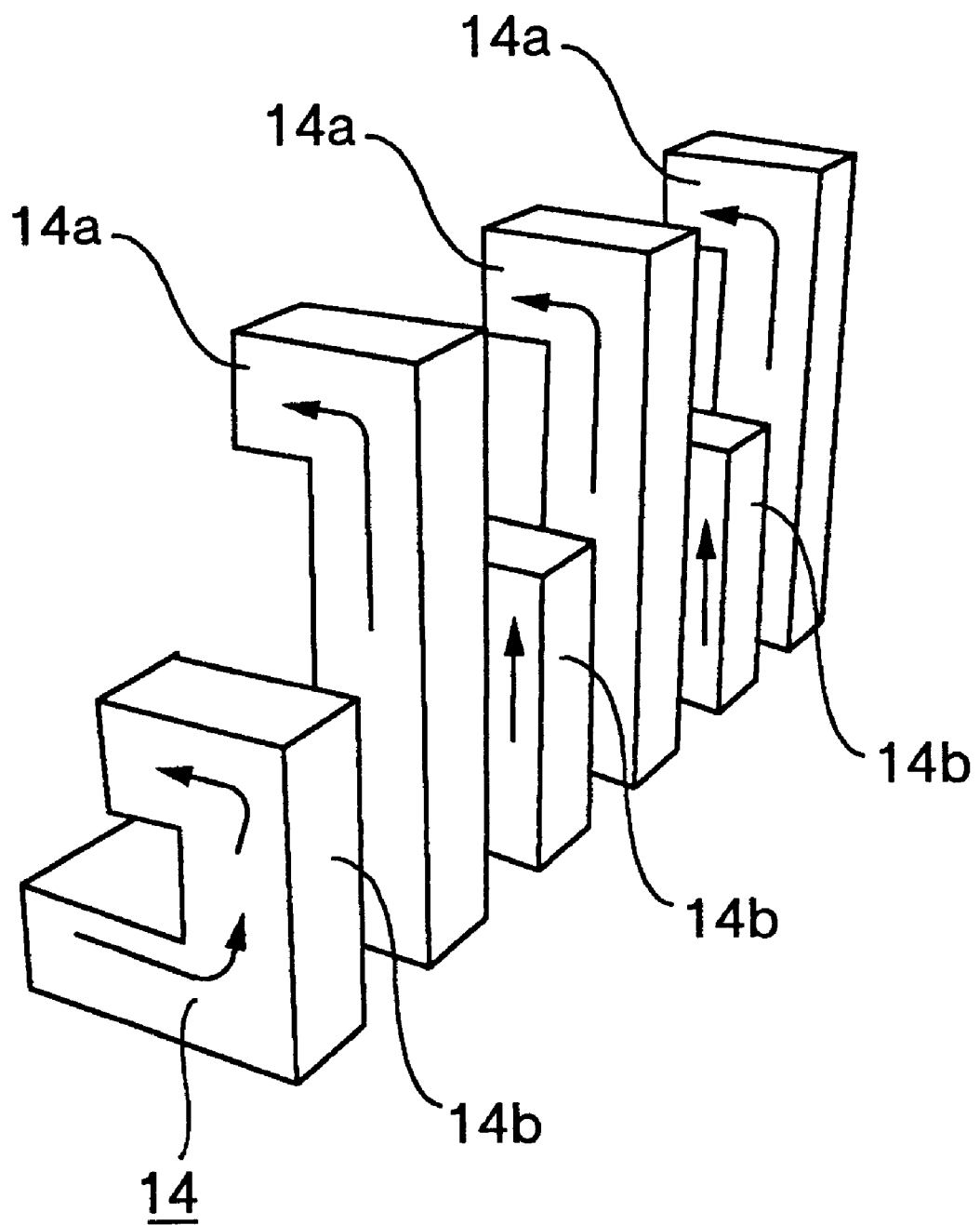
FIG. 10 is an oblique projection view showing another part of the another stator magnetic core of FIG. 8.
Figure 11:
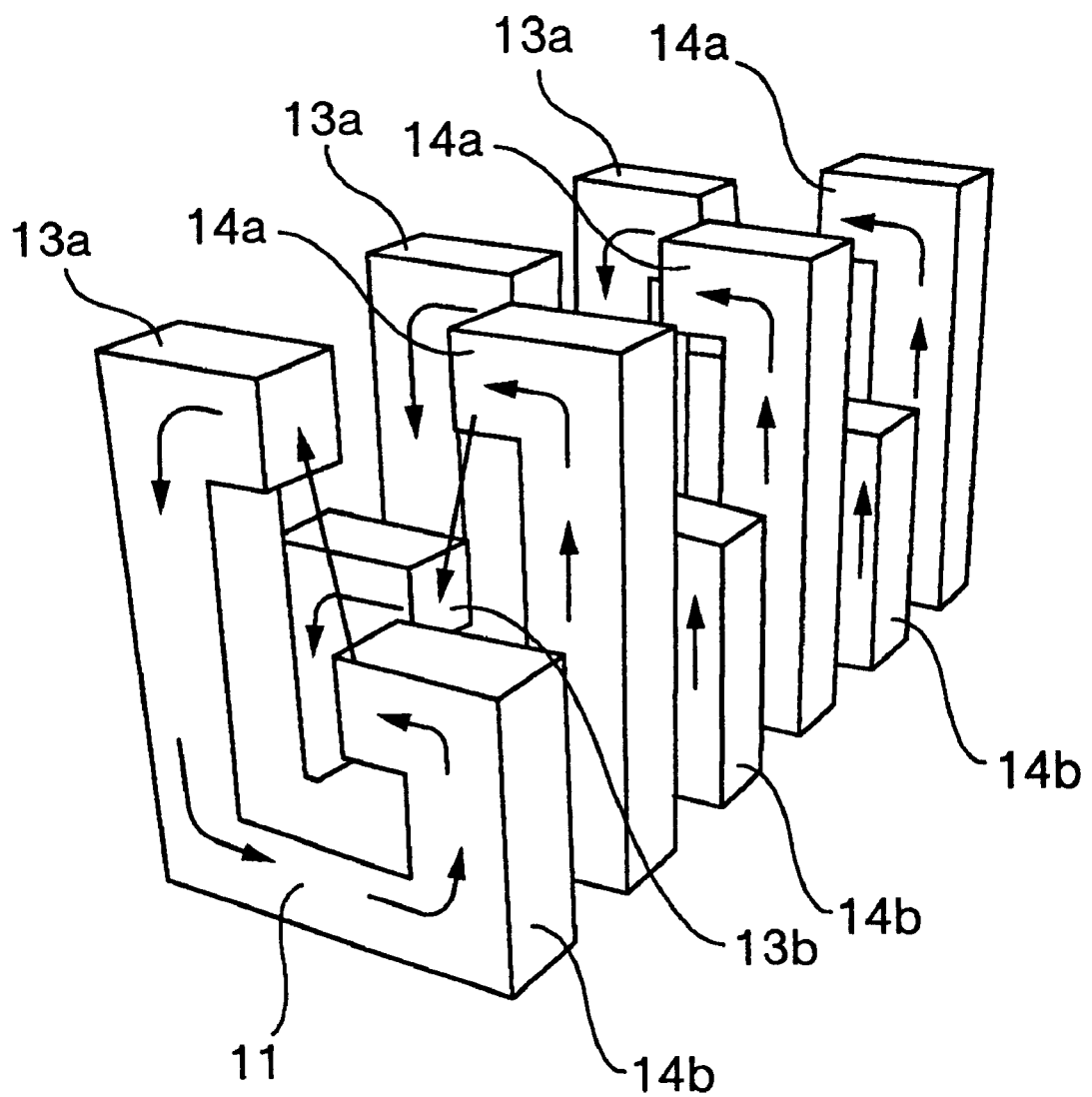
FIG. 11 is an oblique projection view showing the another stator magnetic core of FIG. 8.

As shown in FIG. 9, the magnetic core part 13 of the magnetic core 11 has the first magnetic poles 13a and the second magnetic poles 13b, and as shown in FIG. 10, the magnetic core part 14 of the magnetic core 11 has the first magnetic poles 14a and the second magnetic poles 14b. Arrows in FIGS. 9 and 10 denote flows of magnetic flux generated in the magnetic core 11 by the electromagnetic coil 12. As shown in FIG. 11, in the assembled magnetic core 11, the polar direction of the pair of the first magnetic poles 13a and the second magnetic poles 14b is opposite to the polar direction of the pair of the first magnetic poles 13b and the second magnetic poles 14a adjacent to the pair of the first magnetic poles 13a and the second magnetic poles 14b in the movable direction when the magnetic core 11 is magnetized by the electromagnetic coil 12. The movable member 20 extends between the first magnetic poles 13a and the second magnetic poles 14b of each pair and between the first magnetic poles 13b and the second magnetic poles 14a of each pair so that the movable member 20 cooperates magnetically with the magnetic core 11. The magnetic core 11 may be magnetized by a plurality of the electromagnetic coils 12.

Figure 12:
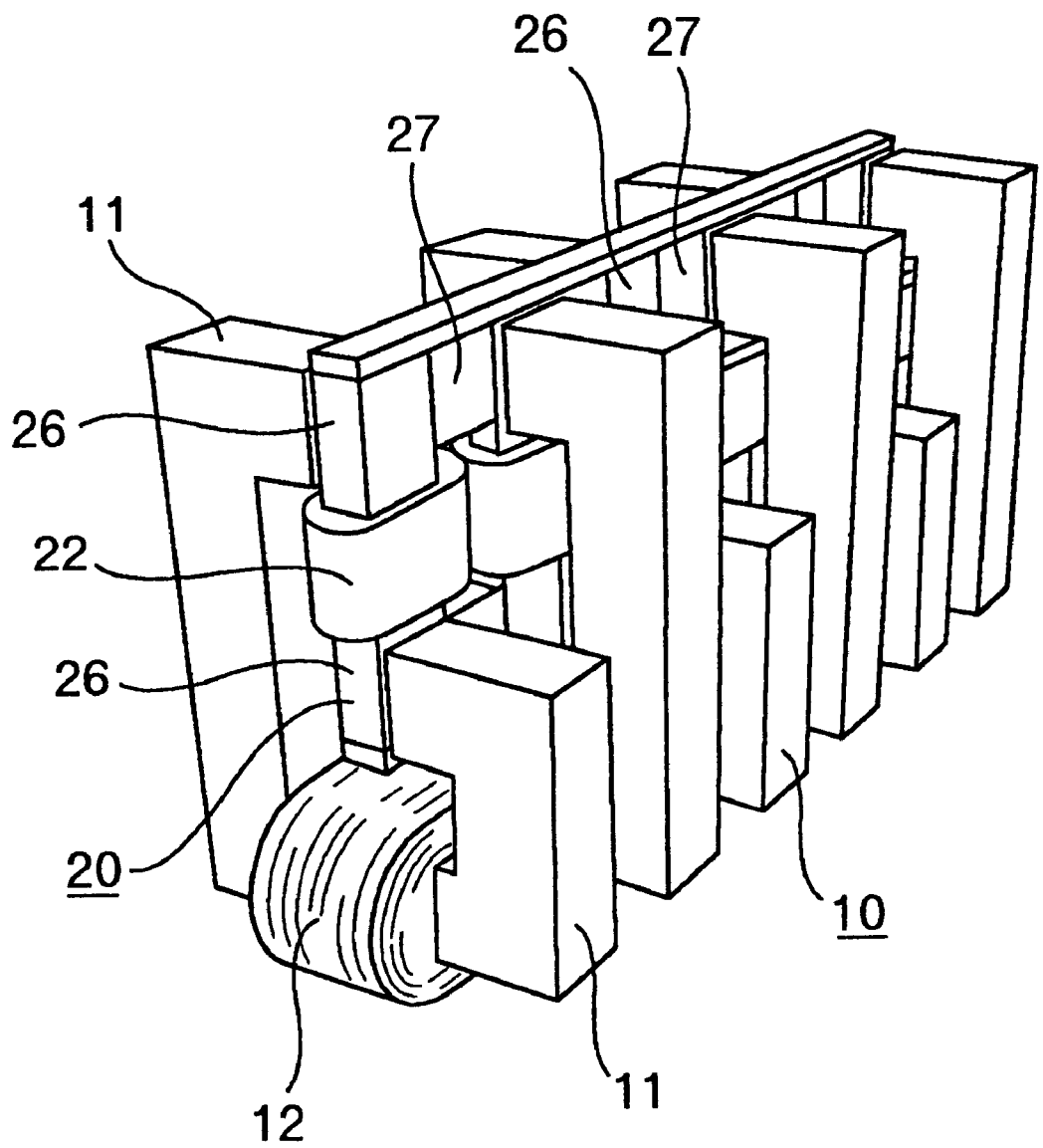
FIG. 12 is an oblique projection view showing a combination of the another stator magnetic core with single electromagnetic coil and another movable member with electromagnetic coils in a linear motor of the invention.

As shown in FIG. 12, the movable member 20 may include the electromagnetic coils 22 which are juxtaposed with each other in the movable direction with the non magnetically conductive areas 27 between the magnetically conductive areas 26 while the polar directions of the electromagnetic coils 22 adjacent to each other in the movable direction are opposite to each other so that the movable member 20 cooperates magnetically with the magnetic core 11. The magnetically conductive areas 26 as the high-magnetic-conductivity pole core members may extend into the electromagnetic coils 22 respectively. A pitch between the magnetic poles adjacent to each other in the movable member 20 is equal to a pitch between the magnetic poles adjacent to each other in the magnetic core 11. The movable member 20 may include both the electromagnetic coils 22 and the permanent magnets 21. The electromagnetic coils 22 may overlap each other as seen in a direction perpendicular to the movable direction. The electromagnetic coils 22 may be printed coils.

Figure 13:
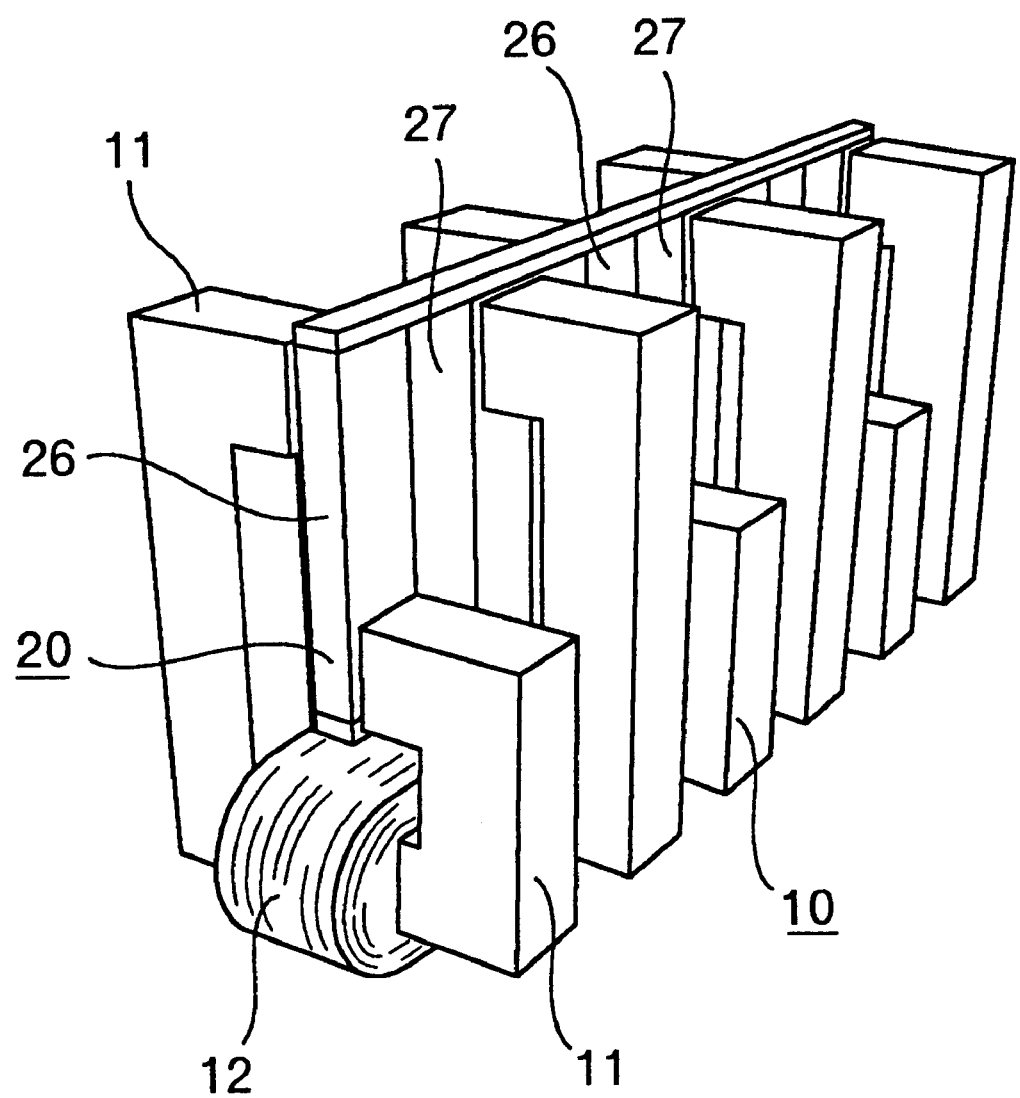
FIG. 13 is an oblique projection view showing a combination of the another stator magnetic core with single electromagnetic coil and another movable member with pairs of high-reluctance portions and low-reluctance portions in another linear motor of the invention.

As shown in FIG. 13, the movable member 20 may include the pairs of the non magnetically conductive areas 27 as the high reluctance portions 25 and the magnetically conductive areas 26 as the low reluctance portions 24 juxtaposed with each other in the movable direction. The permanent magnets 21 may be additionally included by the movable member 20 with the pairs of high reluctance portions 25 and low reluctance portions 24.

Figure 14:
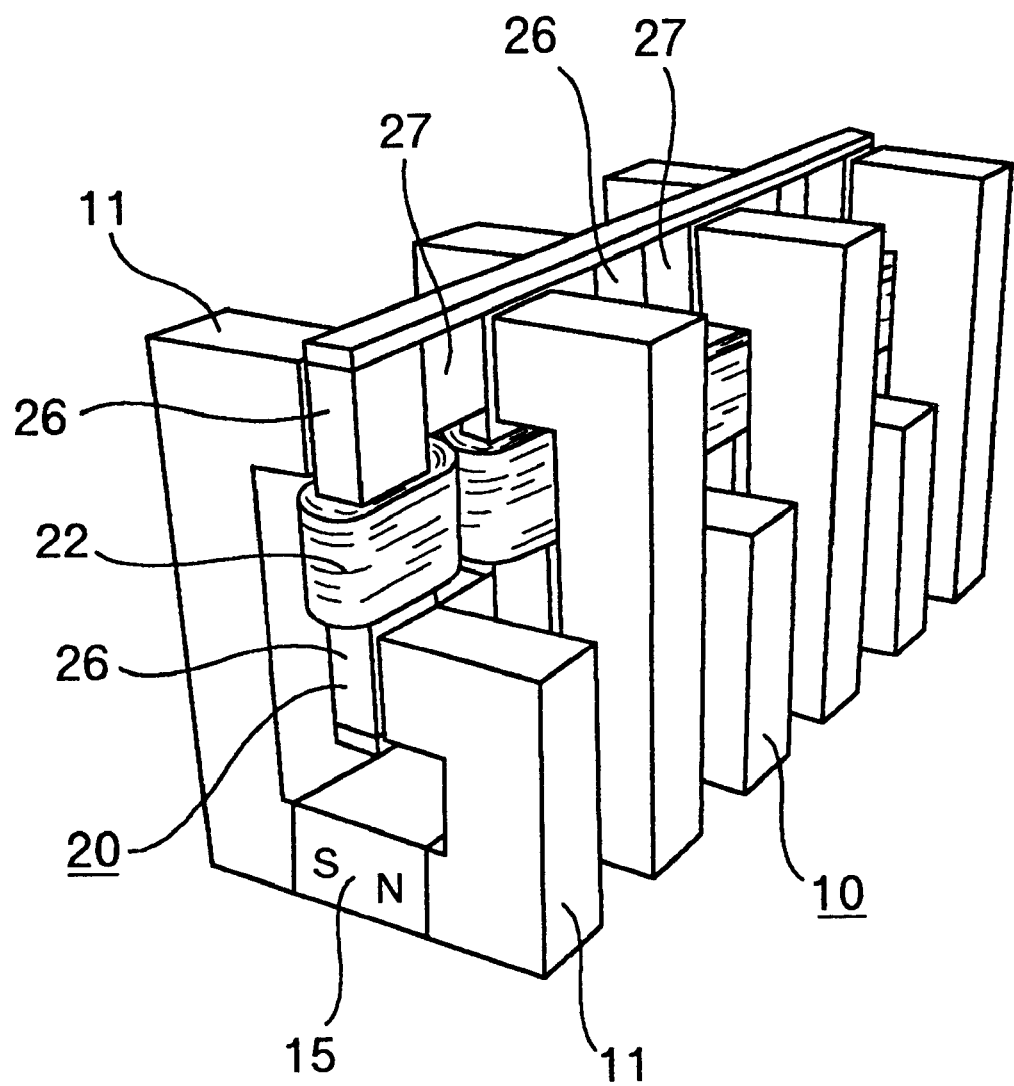
FIG. 14 is an oblique projection view showing a combination of another stator magnetic core with a permanent magnet and the another movable member with pairs of high-reluctance portions and low-reluctance portions in another linear motor of the invention.

As shown in FIG. 14, the magnetic core 11 may be magnetized by the permanent magnet 15. A cross sectional shape of the movable member 20 may be rectangular, circular or oval. The stator 10 may be stationary while the movable member 20 is movable, and alternatively the stator 10 may be movable while the movable member 20 is stationary.

When the stator is single, that is, the linear motor is a single phase linear motor so that the magnetic field is moved between the pairs of magnetic poles adjacent to each other in the movable direction, the movable member 20 is moved or reciprocates between the pairs of magnetic poles adjacent to each other in the movable direction.

Figure 15:
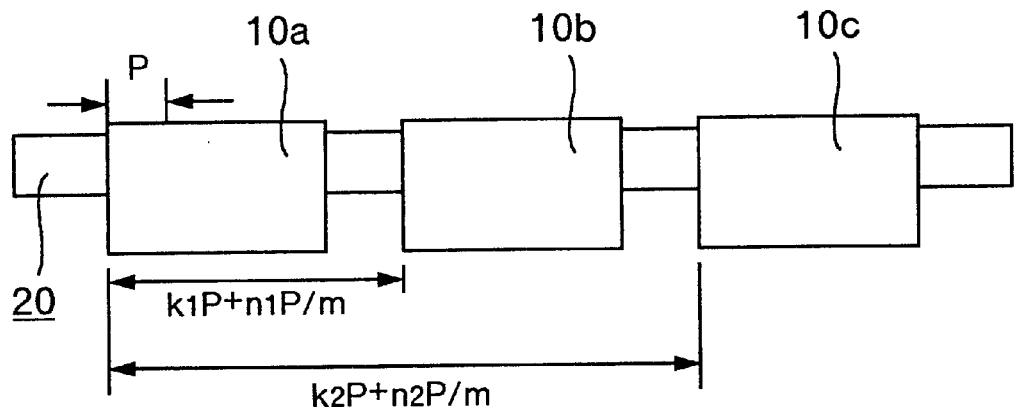
FIG. 15 is a schematic view showing a combination of single movable member, and a plurality of stators arranged in series.
Figure 16:
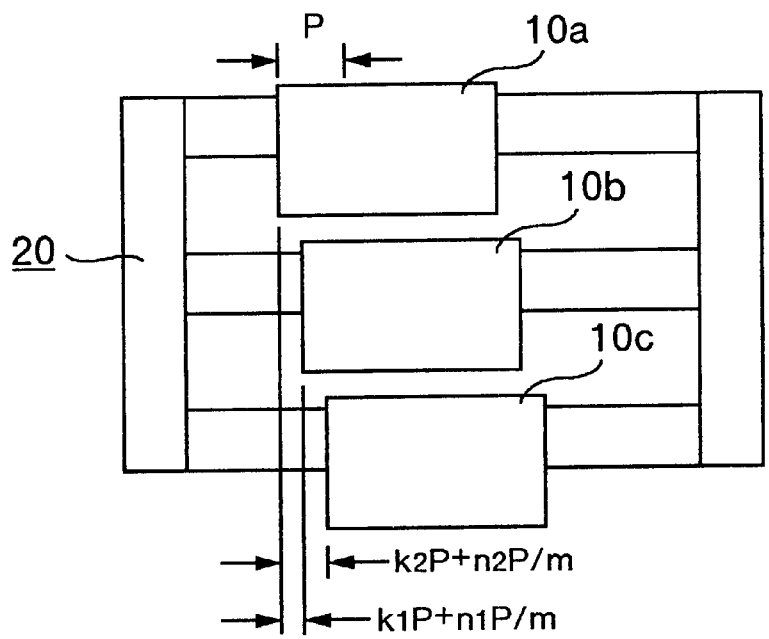
FIG. 16 is a schematic view showing a combination of a plurality of movable members arranged in parallel, and a plurality of stators arranged in parallel.

As shown in FIGS. 15 and 16, a distance between the pair of magnetic poles of one of the stators and the pair of magnetic poles of another one of the stators 10 juxtaposed with each other in the movable direction=(k*P)+n(P/M), when P is a pitch Ps of the pairs of the magnetic poles in each of the stators and a pitch Pm of the magnetic poles of the movable member 20 adjacent to each other in the movable direction, k is an integral number not less than zero, M is a number of the stators 10 energized with respective energized phases different from each other to generate a travelling magnetic field while M is an integral number not less than two, and n is a series of integral number from 1 to M. In FIG. 15, the stators 10 are arranged in series, and in FIG. 16, the stators 10 are arranged in parallel.

Figure 17:
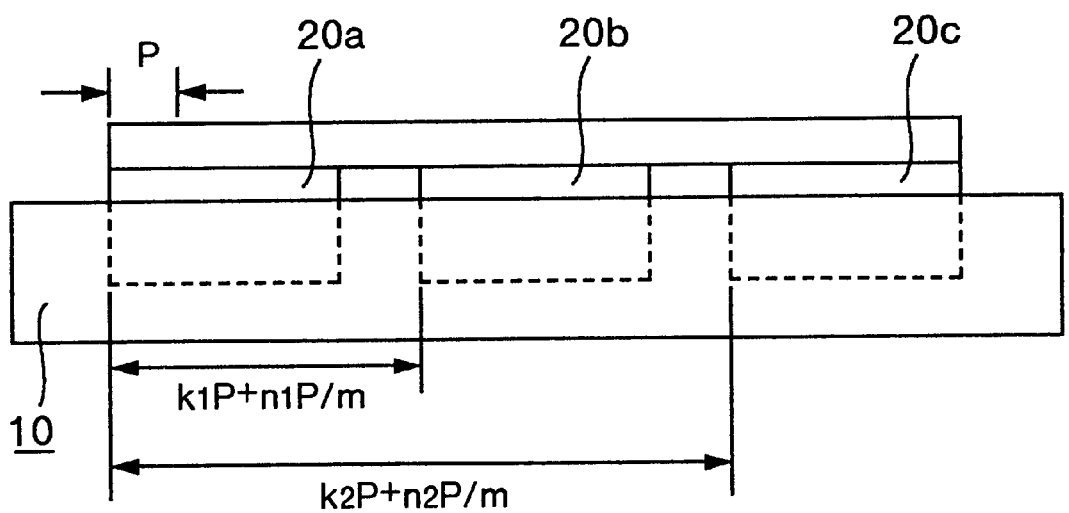
FIG. 17 is a schematic view showing a combination of a plurality of movable members arranged in series, and a stator.
Figure 18:
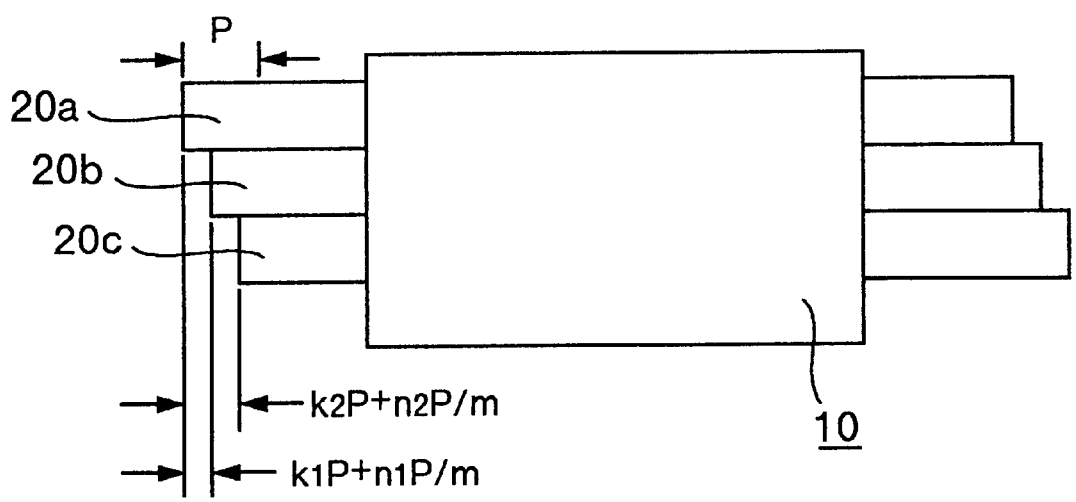
FIG. 18 is a schematic view showing a combination of a plurality of movable members arranged in parallel, and a stator.

As shown in FIGS. 17 and 18, a distance between the pair of magnetic poles of one of the movable members 20 and the pair of magnetic poles of another one of the movable members 20 juxtaposed with each other in the movable direction=(k*P)+n(P/M), when P is a pitch Ps of the pairs of the magnetic poles in the stator and a pitch Pm of the magnetic poles of the movable members 20 adjacent to each other in the movable direction, k is an integral number not less than zero, M is a number of the movable members 20 energized with respective energized phases different from each other to generate a travelling magnetic field while M is an integral number not less than two, and n is a series of integral number from 1 to M. In FIG. 17, the movable members 20 are arranged in series, and in FIG. 18, the movable members 20 are arranged in parallel.

The magnetic core 11 has an opening or groove extending from spaces between the magnetic poles 13a and 14b and between the magnetic poles 14a and 13b so that the movable member 20 is inserted into the spaces between the magnetic poles through the opening from an outside of the magnetic core 11 in a direction perpendicular to the movable direction of the movable member 20. When a magnetic flux axis of the magnetic poles of on the stator 10 is distant away from a magnetic flux axis of the magnetic poles on the movable member 10 in a direction perpendicular to the movable direction and not parallel to the polar directions, a magnetic force is generated in the direction so that the magnetic flux axis of the magnetic poles of on the stator 10 and the magnetic flux axis of the magnetic poles on the movable member 10 are urged to approach each other in the direction. At least one of the pairs of magnetic poles may be energized to generate the magnetic force for supporting a force to be borne by the movable member 10 in the direction.

Figure 19:
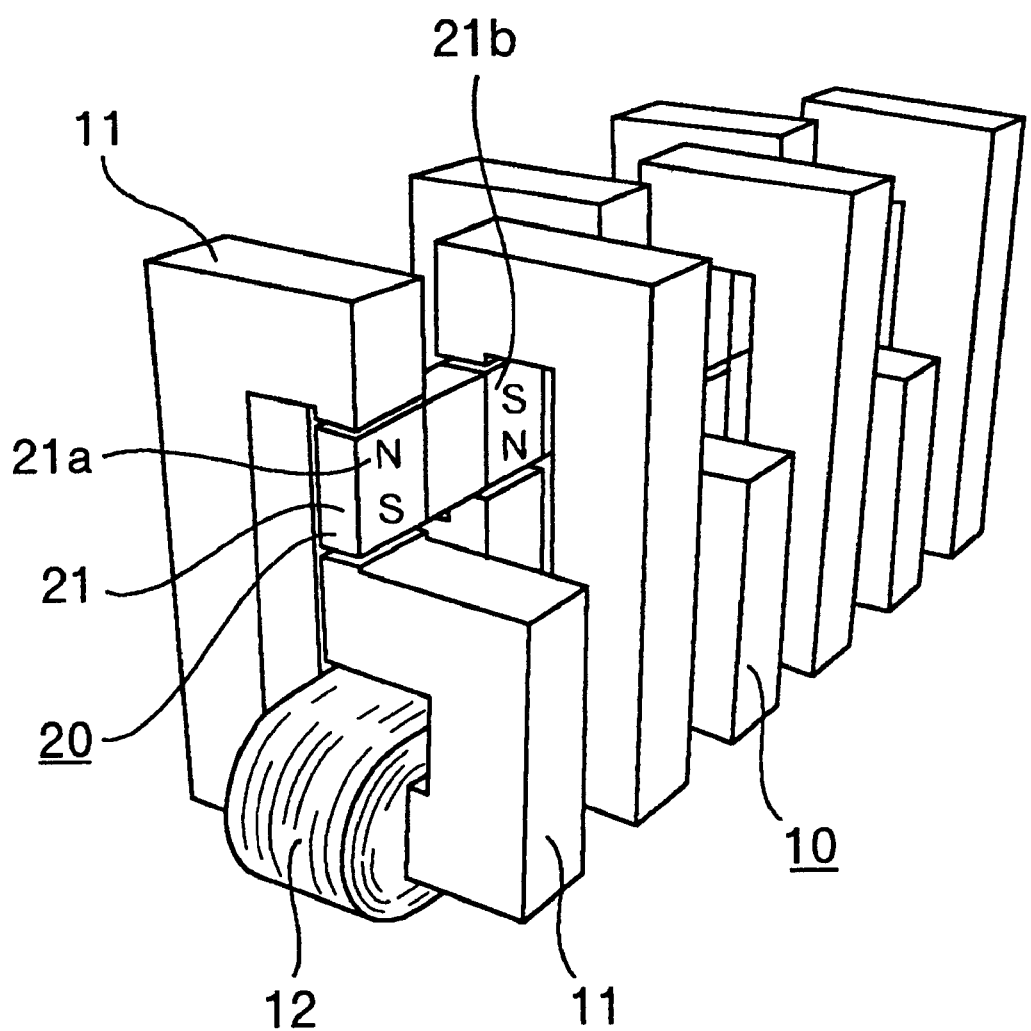
FIG. 19 is an oblique projection view showing a combination of another stator magnetic core with single electromagnetic coil and another movable member with permanent magnets in another linear motor of the invention.

As shown in FIG. 19, the movable member 10 may be surrounded by the magnetic core 11.

What is claimed is:

1. A linear motor comprising:
   a stator;
   a movable element movable with respect to the stator in a movable direction; and
   an electromagnetic coil device for energizing at least one of the movable element and the stator to be magnetized so that a relative movement between the movable element and the stator in the movable direction is generated by a magnetic field between the movable element and the stator;
   wherein the stator includes at least one pair of magnetic core parts, and at least two pairs of magnetic poles adjacent to each other in the movable direction, the magnetic poles of each of the at least two pairs are aligned on an imaginary line per-perpendicular to the movable direction to generate the magnetic field passing the magnetic poles of each pair through the movable element,
   a magnetic polar direction of one of the at least two pairs is opposite to that of an other one of the at least two pairs adjacent to the one of the at least two pairs in the movable direction,
   a first one of the magnetic poles of each of the at least two pairs faces to a first side surface of the movable element, and
   a second one of the magnetic poles of each of the at least two pairs faces to a second side surface of the movable element opposite to the first side surface in a direction perpendicular to the movable direction, and
   wherein one of the magnetic core parts forms both of the first one of the magnetic poles of the one of the at least two pairs and the second one of the magnetic poles of the another one of the at least two pairs adjacent to the one of the at least two pairs in the movable direction, and another one of the magnetic core parts forms both of the first one of the magnetic poles of the another one of the at least two pairs and the second one of the magnetic poles of the one of the at least two pairs adjacent to the another one of the at least two pairs in the movable direction.

2. A linear motor according to claim 1, wherein the pair of magnetic core parts is magnetized by a single electromagnetic coil.

3. A linear motor according to claim 1, wherein the at least one of the movable element and the stator energized by the electromagnetic coil device has at least two parts to be magnetized respectively with a difference in energized phase between the at least two parts so that a traveling magnetic field for generating the relative movement between the movable element and the stator element in the movable direction is formed, and each of the at least two parts is magnetized by single electromagnetic coil.

4. A linear motor according to claim 1, wherein the stator includes at least two of the pairs of magnetic core parts and at least four of the pairs of magnetic poles juxtaposed with each other in the movable direction, each of the at least two pairs of magnetic core parts forms at least partially two of the at least four pairs of magnetic poles adjacent to each other in the movable direction, and a magnetic polar direction of one of the two of the at least four pairs of magnetic poles is opposite to a magnetic polar direction of another one of the two of the at least four pairs of magnetic poles.

5. A linear motor according to claim 4, wherein each of the at least two pairs of magnetic core parts is magnetized by a single electromagnetic coil.

6. A linear motor according to claim 1, wherein the movable member includes at least one of an electromagnetic coil and a permanent magnet to form pairs of magnetic poles juxtaposed with each other in the movable direction.

7. A linear motor according to claim 1, wherein the movable member includes pairs of high-reluctance portions and low-reluctance portions adjacent to each other in the movable direction, and the pairs of high-reluctance portions and low-reluctance portions are juxtaposed with each other in the movable direction.

8. A linear motor according to claim 1, wherein the stator is stationary, and the movable element is moved.

9. A linear motor according to claim 1, wherein the electromagnetic coil device energizes the movable element.

10. A linear motor according to claim 1, wherein the electromagnetic coil device energizes the stator.

11. A linear motor according to claim 1, wherein the stator has a permanent magnet for forming therein at least one pair of magnetic poles.

12. A linear motor according to claim 1, wherein the stator has an opening through which the movable element is inserted between the magnetic poles of each of the pairs in a direction perpendicular to the movable direction.

13. A linear motor comprising,
    a stator;
    a movable element movable with respect to the stator in a movable direction; and
    an electromagnetic coil device for energizing at least one of the movable element and the stator to be magnetized so that a relative movement between the movable element and the stator in the movable direction is generated by a magnetic field between the movable element and the stator;
    wherein the stator includes at least one pair of magnetic core parts, and at least two pairs of magnetic poles adjacent to each other in the movable direction, the magnetic poles of each of the at least two pairs are aligned on an imaginary line perpendicular to the movable direction to generate the magnetic field passing the magnetic poles of each pair through the movable element,
    a magnetic polar direction of one of the at least two pairs is opposite to that of an other one of the at least two pairs adjacent to the one of the at least two pairs in the movable direction,
    a first one of the magnetic poles of each of the at least two pairs faces to a first side surface of the movable element, and
    a second one of the magnetic poles of each of the at least two pairs faces to a second side surface of the movable element opposite to the first side surface in a direction perpendicular to the movable direction, and
    wherein one of the magnetic core parts forms both of the first one of the magnetic poles of the one of the at least two pairs and the first one of the magnetic poles of the another one of the at least two pairs adjacent to the one of the at least two pairs in the movable direction, and another one of the magnetic core parts forms both of the second one of the magnetic poles of the another one of the at least two pairs and the second one of the magnetic poles of the one of the at least two pairs adjacent to the another one of the at least two pairs in the movable direction.

14. A linear motor according to claim 13, wherein the pair of magnetic core parts is magnetized by a single electromagnetic coil.

15. A linear motor comprising:
a first member;
a second member movable with respect to the first member in a movable direction; and
an electromagnetic coil device for energizing at least one of the first member and the second member to be magnetized so that a relative movement between the first member and the second member in the movable direction is generated by a magnetic field between the first member and the second member;
wherein the first member includes at least one pair of magnetic core parts, and at least two pairs of magnetic poles adjacent to each other in the movable direction, the magnetic poles of each of the at least two pairs are aligned on an imaginary line perpendicular to the movable direction to generate the magnetic field passing the magnetic poles of each pair through the second member,
a magnetic polar direction of one of the at least two pairs is opposite to that of an other one of the at least two pairs adjacent to the one of the at least two pairs in the movable direction,
a first one of the magnetic poles of each of the at least two pairs faces to a first side surface of the second member, and
a second one of the magnetic poles of each of the at least two pairs faces to a second side surface of the second member opposite to the first side surface in a traverse direction perpendicular to the movable direction, and
wherein one of the magnetic core parts forms both of the first one of the magnetic poles of the one of the at least two pairs and the second one of the magnetic poles of the another one of the at least two pairs adjacent to the one of the at least two pairs in the movable direction, and another one of the magnetic core parts forms both of the first one of the magnetic poles of the another one of the at least two pairs and the second one of the magnetic poles of the one of the at least two pairs adjacent to the another one of the at least two pairs in the movable direction,
wherein the second member is stationary, and the first member is moved.

16. A linear motor comprising,
a stator;
a movable element movable with respect to the stator in a movable direction; and
an electromagnetic coil device for energizing at least one of the movable element and the stator to be magnetized so that a relative movement between the movable element and the stator in the movable direction is generated by a magnetic field between the movable element and the stator;
wherein the stator includes at least one pair of magnetic core parts, and at least two pairs of magnetic poles adjacent to each other in the movable direction, the magnetic poles of each of the at least two pairs are aligned on an imaginary line perpendicular to the movable direction to generate the magnetic field passing the magnetic poles of each pair through the movable element,
a magnetic polar direction of one of the at least two pairs is opposite to that of an other one of the at least two pairs adjacent to the one of the at least two pairs in the movable direction,
a first one of the magnetic poles of each of the at least two pairs faces to a first side surface of the movable element, and
a second one of the magnetic poles of each of the at least two pairs faces to a second side surface of the movable element opposite to the first side surface in a traverse direction perpendicular to the movable direction,
wherein one of the stator and the movable member comprises at least two parts energized respectively to be magnetized with a difference in energized phase between the at least two parts so that a travelling magnetic field for urging the movable element in the movable direction is generated by a cooperation between the at least two parts,
a distance between a pair of magnetic poles of one of the at least two parts and a pair of magnetic poles of an other one of the at least two parts adjacent to each other in the movable direction=$(k*P)+(P/M)$, when P is a pitch of the pairs of the magnetic poles adjacent to each other in the movable direction in each of the at least two parts, k is an integral number not less than zero, and M is a number of the parts energized with respective energized phases different from each other while M is an integral number not less than two.

17. A linear motor comprising,
a stator;
a movable element movable with respect to the stator in a movable direction; and
an electromagnetic coil device for energizing at least one of the movable element and the stator to be magnetized so that a relative movement between the movable element and the stator in the movable direction is generated by a magnetic field between the movable element and the stator;
wherein the stator includes at least one pair of magnetic core parts, and at least two pairs of magnetic poles adjacent to each other in the movable direction, the magnetic poles of each of the at least two pairs are aligned on an imaginary line perpendicular to the movable direction to generate the magnetic field passing the magnetic poles of each pair through the movable element,
a magnetic polar direction of one of the at least two pairs is opposite to that of an other one of the at least two pairs adjacent to the one of the at least two pairs in the movable direction,
a first one of the magnetic poles of each of the at least two pairs faces to a first side surface of the movable element, and
a second one of the magnetic poles of each of the at least two pairs faces to a second side surface of the movable element opposite to the first side surface in a traverse direction perpendicular to the movable direction,
wherein the electromagnetic coil device has an electromagnetic coil whose circumferential part is surrounded by the pair of magnetic core parts as seen in the movable direction.

18. A linear motor comprising:
a first element having a first core part and a second core part; and
a second element having a magnet;
wherein said first core part includes first teeth arranged in a direction from said second element and second teeth arranged in an other direction from said second element,
said second core part includes first teeth arranged in the direction from said second element and second teeth arranged in the another direction from said second element, said first teeth of said first core part and said second teeth of said second core part are opposed to each other through a first gap, said first teeth of said second core part and said second teeth of said first core part are opposed to each other through a second gap, said second element is arranged in said first gap and said second gap, and said first core part or said second core part has a coil.

* * * * *